United States Patent
Riddick et al.

(10) Patent No.: US 7,537,104 B2
(45) Date of Patent: May 26, 2009

(54) METHODS FOR ACCUMULATING, MOVING, AND PALLETIZING ARTICLES

(75) Inventors: David W. Riddick, Luling, LA (US); Brett A. Lally, Metairie, LA (US); Mark Costanzo, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 172 days.

(21) Appl. No.: 11/766,209

(22) Filed: Jun. 21, 2007

(65) Prior Publication Data

US 2007/0284220 A1   Dec. 13, 2007

Related U.S. Application Data

(63) Continuation of application No. 10/908,326, filed on May 6, 2005, now Pat. No. 7,249,671.

(51) Int. Cl.
*B65G 47/26* (2006.01)

(52) U.S. Cl. .................. 198/617; 198/457.05; 414/801

(58) Field of Classification Search ................ 198/382, 198/411, 416, 457.01, 457.02, 457.05, 617, 198/779; 414/801
See application file for complete search history.

(56) References Cited

U.S. PATENT DOCUMENTS

| | | |
|---|---|---|
| 1,931,454 A | 10/1933 | Anderson |
| 3,550,756 A | 12/1970 | Komylak |
| 4,039,074 A | 8/1977 | Maxted |
| 4,676,361 A | 6/1987 | Heisler |
| 5,145,049 A | 9/1992 | McClurkin |
| 5,240,102 A | 8/1993 | Lucas |
| 5,333,722 A | 8/1994 | Ouellette |
| 6,073,747 A | 6/2000 | Takino et al. |
| 6,182,812 B1 | 2/2001 | Hartness, III et al. |
| 6,401,936 B1 | 6/2002 | Isaacs et al. |
| 6,494,312 B2 | 12/2002 | Costanzo |
| 6,497,321 B2 | 12/2002 | Horton et al. |

(Continued)

FOREIGN PATENT DOCUMENTS

JP   03-088617 A1   4/1991

(Continued)

*Primary Examiner*—Douglas A Hess
(74) *Attorney, Agent, or Firm*—James T. Cronvich (57) ABSTRACT

A conveyor using a roller belt with rollers arranged to rotate on oblique axes to urge articles toward a side guide. The conveyor includes an oblique-roller belt supported on a carryway for running in a direction of belt travel. Rollers extend above an outer conveying surface of the belt without contact with the carryway. Each roller rotates on an axis oblique to the direction of belt travel and intersects the side guide downstream of the roller's position. A retractable stop is movable to and from a blocking position along the carryway. In the blocking position, the stop blocks the conveyed articles from advancing in the direction of belt travel. The rollers underlying the blocked articles rotate as the belt runs by contact with the articles. The rotating rollers provide a component of force to the blocked articles directed toward the side guide to push the articles against the side guide or other articles as they accumulate under low pressure upstream of the stop. The conveyor may be used to register articles single file against the side guide or to group the articles for palletizing. For palletizing applications, an infeed conveyor feeds articles onto the belt at the side opposite the side guide.

10 Claims, 7 Drawing Sheets

U.S. PATENT DOCUMENTS

| | | |
|---|---|---|
| 6,568,522 B1 | 5/2003 | Boelaars |
| 6,571,937 B1 | 6/2003 | Costanzo et al. |
| 6,681,922 B2 | 1/2004 | Corley et al. |
| 6,758,323 B2 | 7/2004 | Costanzo |
| 6,923,309 B2 | 8/2005 | Costanzo |
| 6,968,941 B2 | 11/2005 | Fourney |
| 7,007,792 B1 | 3/2006 | Burch |
| 7,073,651 B2 | 7/2006 | Costanzo et al. |
| 7,111,722 B2 | 9/2006 | Burch |
| 7,147,097 B2 | 12/2006 | Lemm |
| 2002/0108839 A1 | 8/2002 | Baker et al. |
| 2004/0173441 A1 | 9/2004 | Wieting et al. |

FOREIGN PATENT DOCUMENTS

| | | |
|---|---|---|
| JP | 08-277029 A | 10/1996 |
| JP | 11-059885 A | 3/1999 |

METHODS FOR ACCUMULATING, MOVING, AND PALLETIZING ARTICLES

CROSS-REFERENCE TO RELATED APPLICATIONS

This application is a continuation of U.S. patent application Ser. No. 10/908,326 now U.S. Pat. No. 7,249,671, entitled "Roller-Belt Conveyor for Accumulating and Moving Articles Laterally across the Conveyor," filed May 6, 2005, and entirely incorporated herein by reference.

BACKGROUND

The invention relates to power-driven conveyors and, more particularly, to methods for using a conveyor belt with obliquely oriented rollers to accumulate, move, or palletize articles.

Many material-handling applications require that conveyed articles be accumulated and aligned single file or arranged in groups for downstream processing or inspection. One way to arrange articles single file against a side of the conveyor is with a conveyor belt having rollers with salient portions that extend beyond top and bottom surfaces of the belt. The rollers roll on supporting bearing surfaces beneath the bottom surface of the belt as it advances in a direction of belt travel. The rollers are arranged to rotate on axles oblique to the direction of belt travel. The rotation of the rollers on their oblique axles provides a sidewise component of force directing conveyed articles atop the rollers toward a side guide flanking the belt. But, because contact between the rollers and the bearing surface is not frictionless, roller wear accelerates and belt tension increases. Furthermore, because the rotation of the oblique rollers pushes the articles forward as well, accumulated articles would experience high back line pressure. Consequently, such a conveyor has shortcomings in applications requiring accumulation of articles in a single file or side by side.

SUMMARY

These shortcomings are overcome by a method for forming a pallet layer, comprising: (a) advancing consecutive articles along a first side of a conveyor moving in a conveying direction and having article-supporting rollers freely rotatable on axes oblique to the conveying direction; (b) blocking the advance of the articles with a stop while the conveyor continues moving to cause the rollers to rotate beneath the articles supported on the rollers to provide a component of force pushing the articles along the stop across the width of the conveyor toward an opposite second side of the conveyor; and (c) forming a first pallet layer row by stopping a leading blocked article at the second side of the conveyor and trailing blocked articles against consecutive leading blocked articles in a row across the width of the conveyor.

In another aspect of the invention, a method for aligning articles against a guide along a conveyor comprises: (a) advancing consecutive articles atop article-supporting rollers on a conveyor moving in a conveying direction, wherein the rollers are freely rotatable on axes oblique to the conveying direction; (b) blocking the advance of a first article of the consecutive articles with a stop while the conveyor continues moving to cause the rollers to rotate on the oblique axes beneath the first article to provide a component of force pushing the first article along the stop and against a guide at a side of the conveyor; and (c) advancing a second article on the conveyor into contact with the blocked first article to cause the rollers beneath the first article to rotate and push the second article along the trailing end of the first article and against the guide.

In yet another aspect of the invention, a method for moving accumulated articles laterally comprises: (a) advancing articles atop article-supporting rollers on a conveyor moving in a conveying direction, wherein the rollers are freely rotatable on axes oblique to the conveying direction; (b) accumulating the articles upstream of a stop blocking articles from advancing past the position of the stop as the conveyor continues to advance with the rollers rotating by contact with the accumulated articles with a component of motion opposite the conveying direction; and (c) moving the accumulated articles laterally toward a side of the conveyor by the rotation of the rollers beneath the accumulated articles with a component of motion directed to the side of the conveyor.

BRIEF DESCRIPTION OF THE DRAWINGS

These features and aspects, as well as advantages, of the invention are better understood by referring to the following description, appended claims, and accompanying drawings, in which:

DETAILED DESCRIPTION

Figure 1:
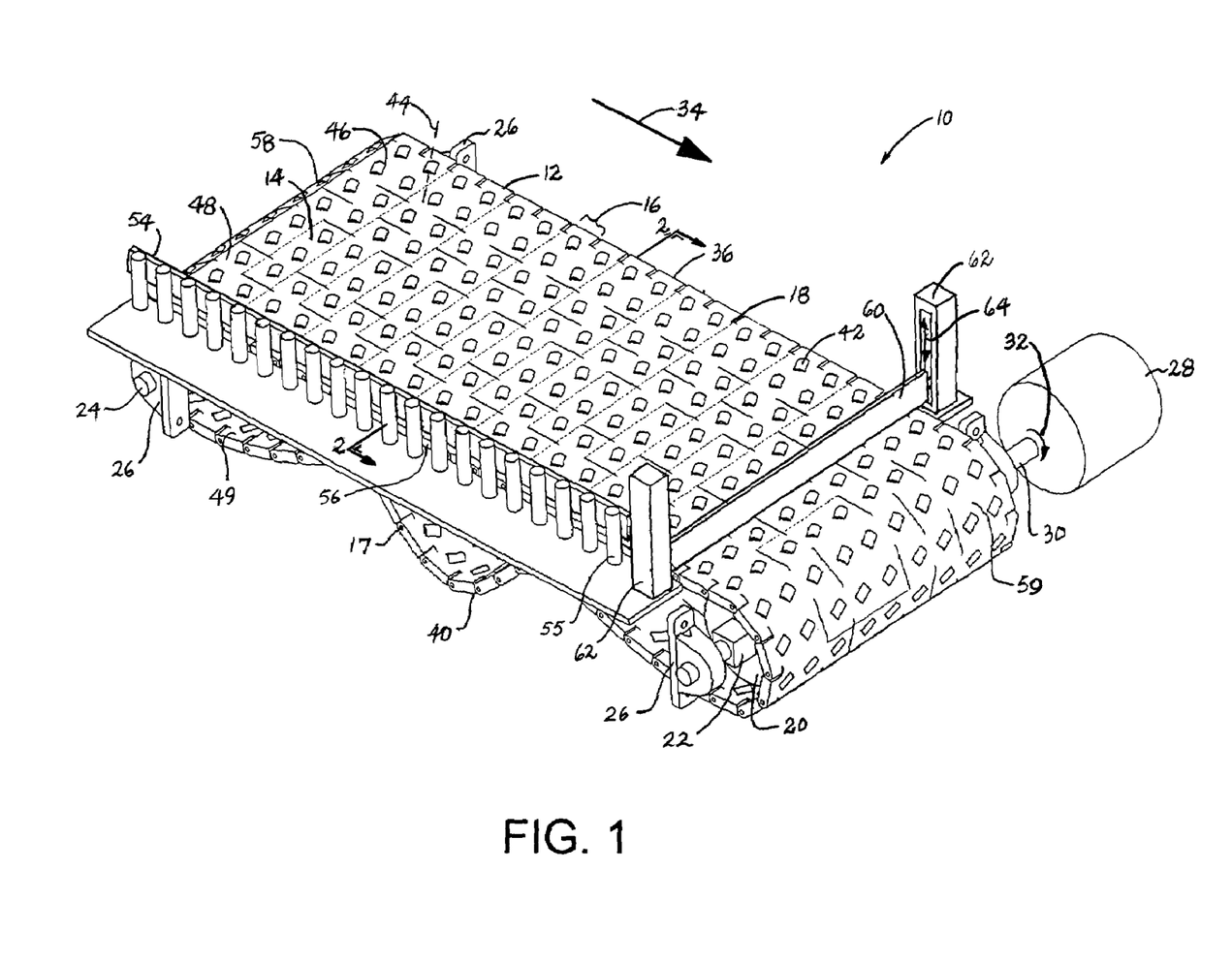
FIG. 1 is an isometric view of a conveyor embodying features of the invention.

FIG. 1 shows a conveyor 10 embodying features of the invention including a conveyor belt 12, such as a modular roller-top conveyor belt. The conveyor belt shown is a modular conveyor belt made up of belt modules 14 arranged in a series of rows 16. The rows are connected together by hinge pins 17 at hinge joints 18 that allow the belt to articulate about drive and idler sprockets 20 at each end of the conveyor. The belt forms an endless loop trained around a drive shaft 22 and an idler shaft 24. The shafts are supported at their ends in bearing blocks 26 mounted on a conveyor frame (not shown for simplicity). A motor 28 is coupled to the drive shaft 22 to drive the belt. As the motor's output shaft 30 rotates as shown by arrow 32, the belt advances in a direction of belt travel 34.

Figure 2:
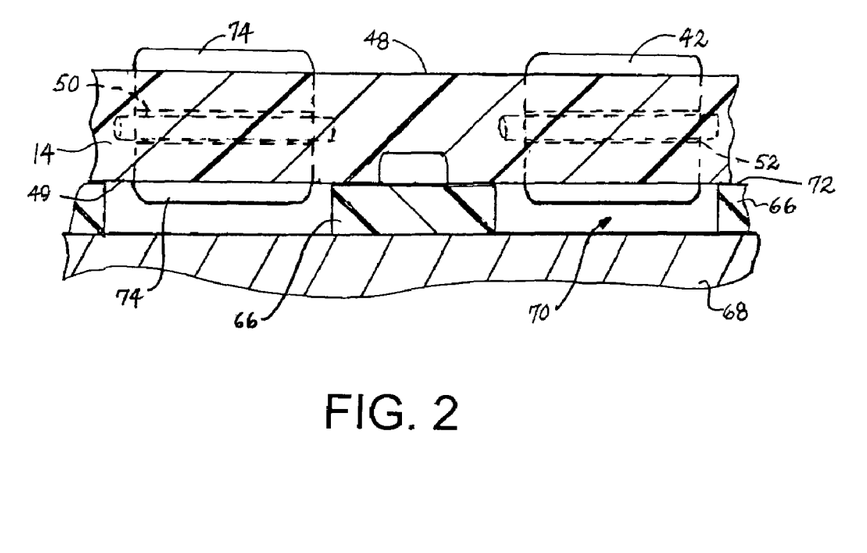
FIG. 2 is a cross section of a portion of the conveyor of FIG. 1 taken along lines 2-2 of FIG. 1.

A portion of the belt loop, in particular the upper, article-conveying portion 36 in FIG. 1, is supported on a carryway 38 (FIG. 2). The belt returns from the drive sprockets via a returnway 40 beneath the carryway. Shoes, drums, or rollers may be used in the returnway to reduce sag in the belt.

The belt includes a plurality of rollers 42, preferably arranged in longitudinal lanes parallel to the direction of belt travel. The rollers are arranged to rotate on axes 44 oblique to the direction of belt travel. For example, the axes may be 30°, 45°, or 60° from the direction of belt travel. In the examples shown, the rollers are mounted in cavities 46 that open onto an outer, article-conveying surface 48 and an opposite inner surface 49 of the belt loop. One suitable belt is the Series 400

Angled Roller™ belt manufactured and sold by Intralox, L.L.C. of Harahan, La., USA. The Intralox belt is made of a thermoplastic polymer such as polypropylene, polyethylene, acetal, or composite materials in an injection-molding process. The rollers 42, as shown in FIG. 2, are generally cylindrical in shape and mounted in the cavities on axles 50. Bores 52 through the rollers receive the axles. The rollers are free to rotate on the axles, which define axes of rotation for the rollers. The ends of the axles are embedded in the body of the belt module 14.

As shown in FIG. 1, a side guide 54, mounted on supports 55, bounds one side 56 of the belt along the carryway 38. The carryway extends in the direction of belt travel 34 from an upstream end 58, at which articles are fed onto the conveyor, to a downstream end 59, from which articles are transferred off the conveyor. A stop 60 at the downstream end of the conveyor is movable from a first position blocking conveyed articles, as shown in FIG. 1, to a second unblocking position allowing arranged articles to pass. An elevator 62 is shown in this example for raising and lowering opposite ends of a stop barrier, as indicated by double-headed arrow 64. In the raised, unblocking position, the stop barrier is elevated high enough above the outer belt surface along the carryway to avoid articles passing below. The stop could be realized in other ways. One example is a gate that swings from a blocking position across the carryway to an unblocking position alongside the carryway.

As shown in FIG. 2, the belt is supported in the carryway on support surfaces, such as metal rails or plastic wearstrips 66, mounted on a conveyor pan 68 or other structure. The wearstrips, which are preferably made of a wear-resistant, low-friction material, such as UHMW (ultra-high molecular weight) plastic, are laid out along the carryway longitudinally in the direction of belt travel and spaced laterally across spaces 70 between consecutive wearstrips. (Spaces may also exist between the lateral outermost wearstrips and the sides of the belt.) The inner surface 49 of the belt rides on bearing surfaces 72 on the wearstrips. Salient portions 74 of the rollers extend from the belt cavities past the outer and inner surfaces of the belt. Articles are conveyed along the carryway atop the salient portions of the rollers extending past the outer, conveying surface. The salient portions of the rollers extending past the inner surface of the belt are positioned in the spaces 70 between adjacent wearstrips. In this way, the rollers do not contact any conveyor structure under the belt along the carryway and are free to rotate or remain stationary.

Figure 3A:
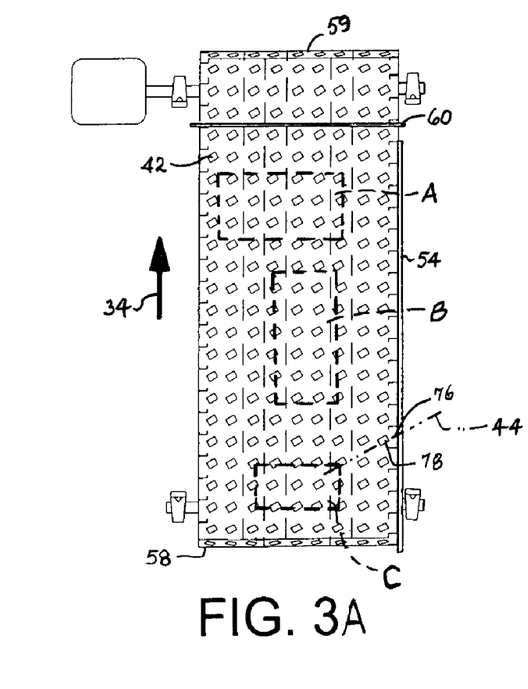
FIGS. 3A-3E are top views of the conveyor of FIG. 1 illustrating its operation.
Figure 3B:
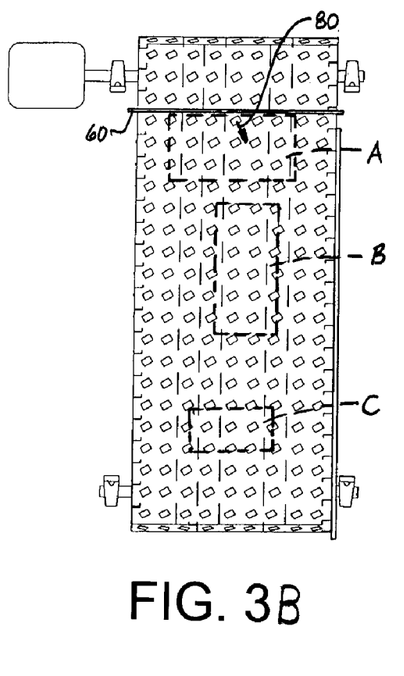
Figure 3C:
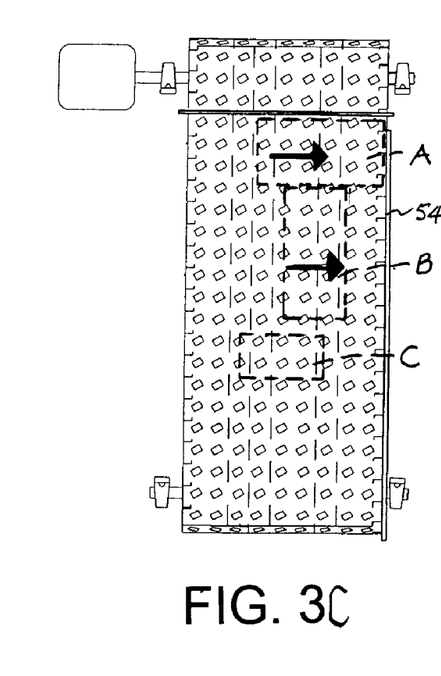
Figure 3D:
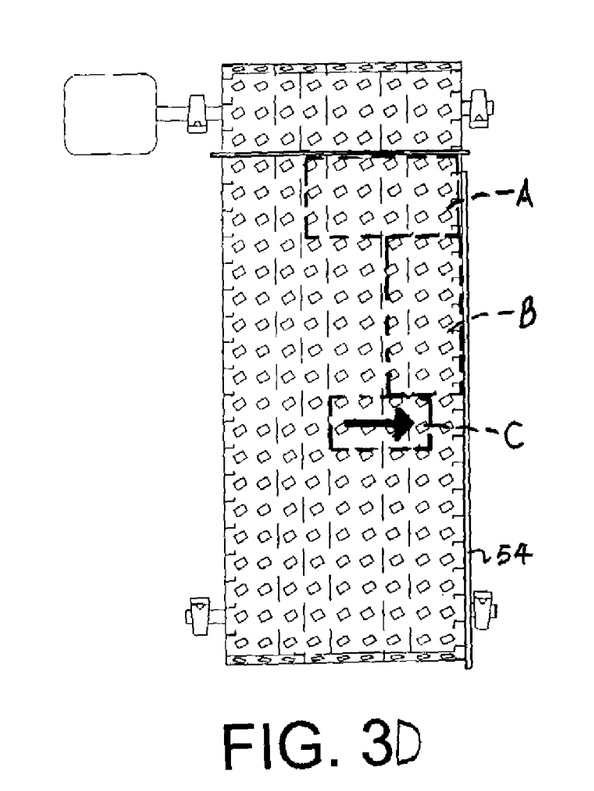
Figure 3E:
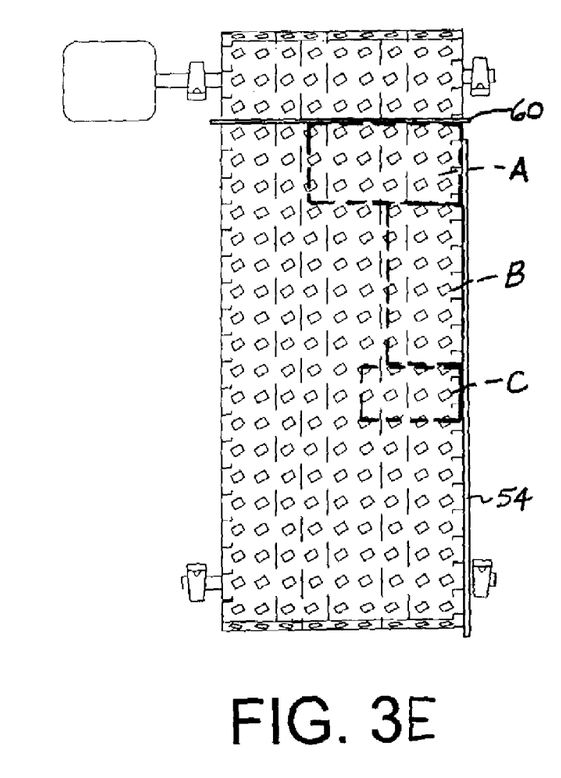

The operation of the conveyor is illustrated step by step in FIGS. 3A-3E with the stop 60 in the blocking position. The carryway extends in the direction of belt travel 34 from the upstream end 58 to the downstream end 59. The rollers 42 rotate on oblique axes 44, each of which intersects the side guide 54 at a point 76 downstream of the roller's position 78. In FIG. 3A, articles A, B, and C are being conveyed along the carryway in the direction of belt travel atop the rollers. The rollers, which do not contact the carryway or its wearstrips, are not rotating significantly, and the articles travel with the belt. In FIG. 3B, lead article A meets the stop 60 blocking its further passage along the carryway. Trailing articles B and C continue to advance with the running belt toward article A. With article A blocked, the rollers beneath it rotate as they encounter the article's bottom surface. Because article A is prevented from advancing in the direction of belt travel, it causes the rollers beneath it to rotate in the direction indicated by arrow 80. The direction 80 is perpendicular to the roller axis and has a first component opposite the direction of belt travel and a second component directed toward the side guide. The component opposite the direction of belt travel generally matches the speed of the belt and allows articles to accumulate with low backline pressure against each other and the stop. The component directed toward the side pushes article A against the side guide 54, as shown in FIG. 3C. As article B catches up to blocked article A and is, in turn, blocked by it, the rollers start to rotate under article B as they pass beneath it. The rotation of the rollers under article B urges it toward the side guide, too, as article C is still being conveyed along. Eventually, as shown in FIG. 3D, article C bumps into leading article B. Prevented from advancing in the direction of belt travel, article C causes the rollers to rotate as they pass below, which applies a component of force toward the side guide. As shown in FIG. 3E, articles A, B, and C are registered against the side guide and accumulated under low pressure against the stop. Once the stop is moved to its unblocking position, the articles will advance in the direction of belt travel along the side of the conveyor.

Figure 4A:
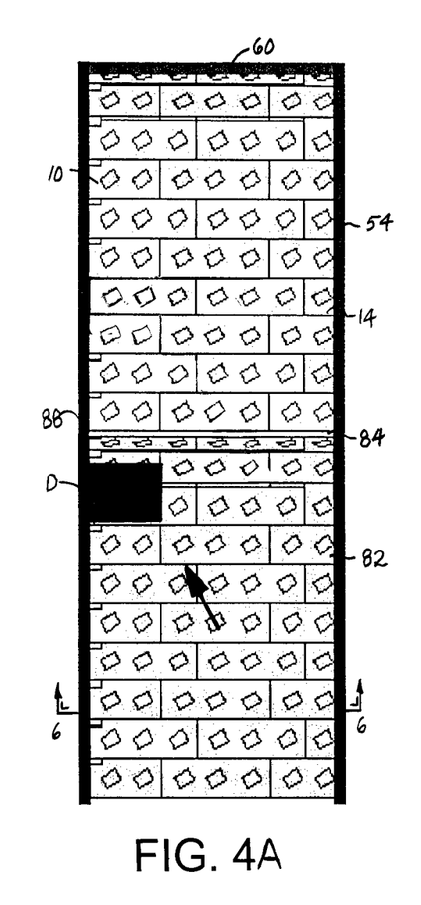
FIGS. 4A-4F are top views of the conveyor of FIG. 1 illustrating its operation when configured as a palletizer.
Figure 4B:
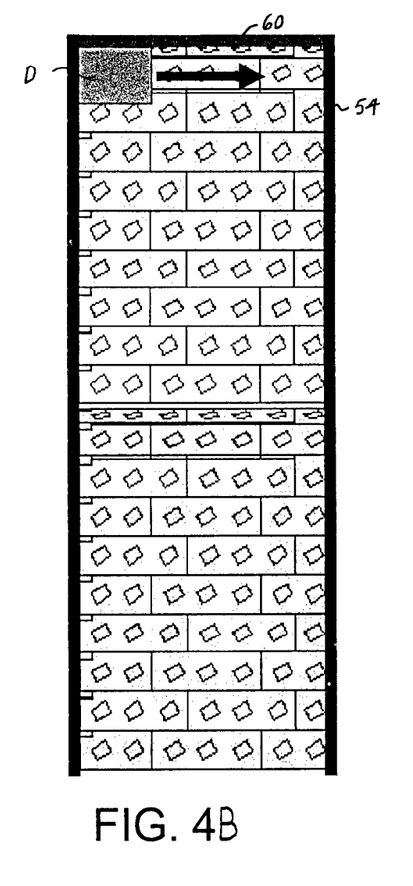
Figure 4C:
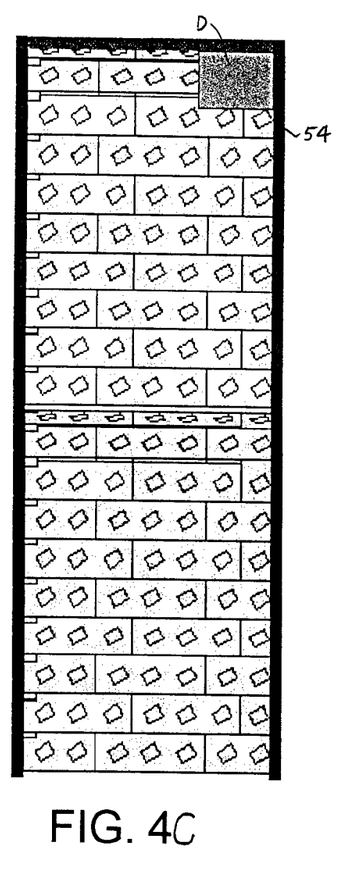
Figure 4D:
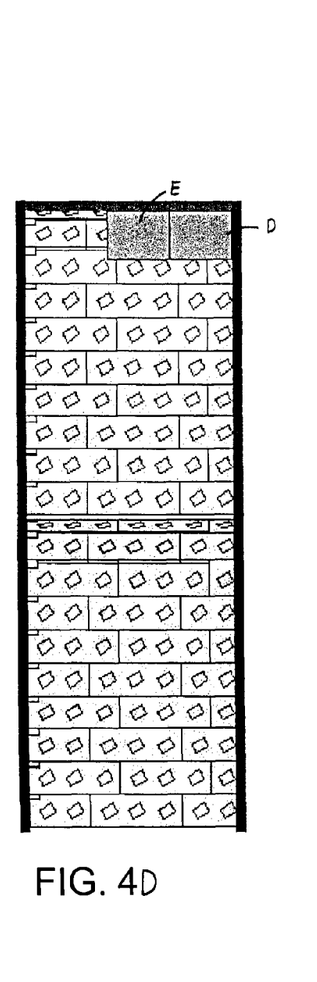
Figure 4E:
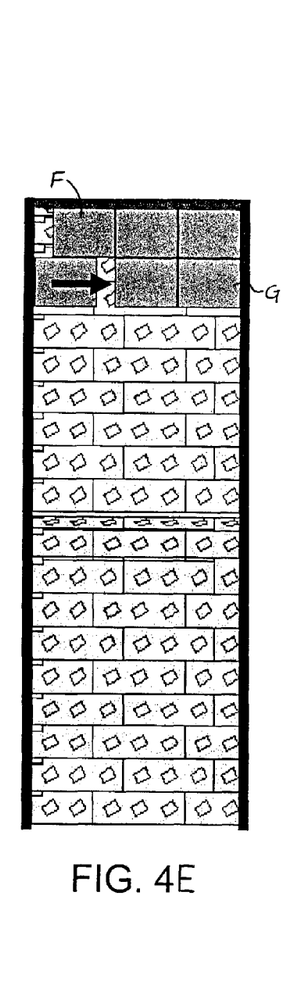
Figure 4F:
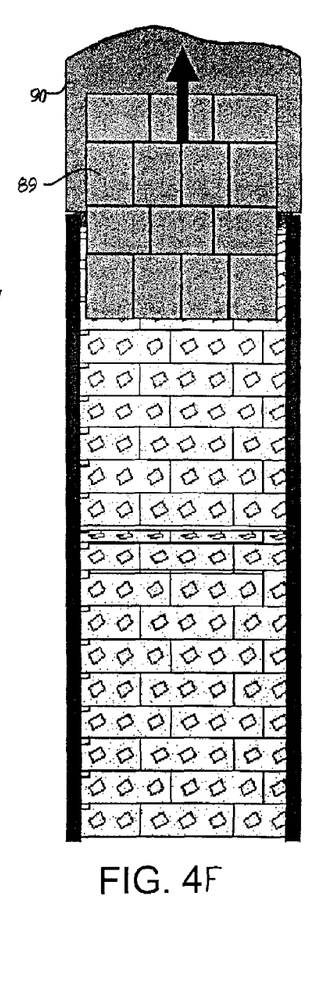
Figure 6:
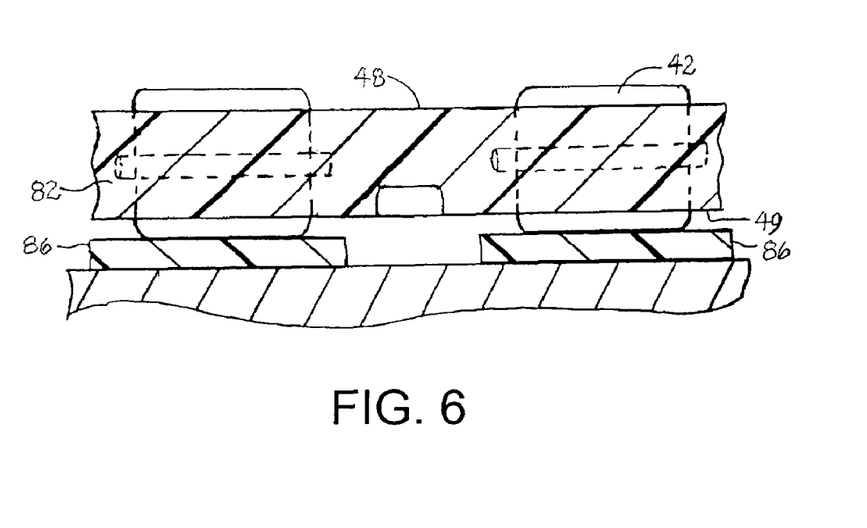
FIG. 6 is a cross section of the conveyor of FIG. 4A taken along lines 6-6 of FIG. 4A.

The accumulation and registration capabilities of the conveyor make it especially suitable for grouping articles before palletizing. As shown in FIG. 4A, the accumulation and registration conveyor 10 receives a conveyed article D from an upstream conveyor belt 82 across a gap 84, which may be partly filled by a transfer plate. The upstream conveyor belt could be, as shown in FIG. 4A, identical in construction to the belt 14 in the downstream conveyor. But the upstream belt is operated differently from the downstream belt. As shown in FIG. 6, the rollers 42 in the upstream belt 82 extend past its inner surface 49 and its outer surface 48 and ride on supporting bearing surfaces 86, such as UHMW wearstrips, in rolling contact. As the belt advances, the rollers rotate on the bearing surfaces and propel articles toward the left side against a left side guide 88, as indicated by the arrow in FIG. 4A. Article D continues along the left side of the downstream conveyor along the extended side guide. When article D hits the stop 60, its forward progress is stopped, which causes the free rollers under it to rotate opposite to the direction of rotation of the rollers in the upstream conveyors and push article D laterally along the stop in the direction of the arrow in FIG. 4B toward the right side guide. Eventually article D registers against the right side rail and the stop, as shown in FIG. 4C. Subsequent articles, such as article E in FIG. 4D, are moved toward the left side guide by the upstream conveyor and, once blocked, are moved toward the right on the downstream conveyor. Article E follows the same general path as article D, but comes to a full stop beside article D. FIG. 4E shows the formation of a packed group of articles in two rows. Because the final article in the leading row, article F, does not leave enough room between itself and the left side guide, the following article, article G, is pushed by the rollers across the belt to the right side guide along the rear of the leading row of articles. The process continues until a group 89 of articles of a predetermined size and shape is formed. Then the stop is retracted from its blocking position to an unblocking position, and the group is advanced by the downstream conveyor, as shown in FIG. 4F onto a palletizer table 90, for example. As also shown in FIG. 4F, each row could be arranged with articles in different orientations by an upstream process that presents the articles in the correct orientation to the conveyor.

Figure 5A:
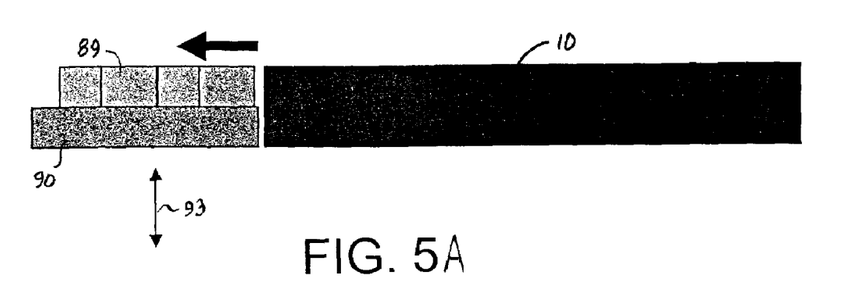
FIGS. 5A-5B are side elevation schematic views of the conveyor of FIG. 1 operating as a palletizer as in FIGS. 4A-4F.
Figure 5B:
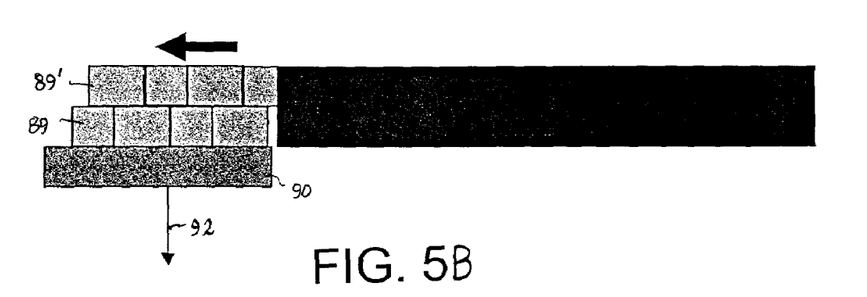

FIGS. 5A-5B illustrate the formation of a pallet of articles on the palletizer table 90. As soon as the group of products for the bottom layer of the pallet to be formed is transferred completely from the conveyor 10 to the table, the table is lowered, as indicated by arrow 92 in FIG. 5B, to level at which the tops of the article in the bottom layer 89 are generally level with the outer surface of the conveyor belt. Then a second layer 89' is formed and transferred onto the top of the first layer, and the table is lowered again for a third layer, and so on, until a pallet of predetermined size is formed. After the pallet is removed, the table is elevated to its original position to receive the next bottom layer, as indicated by two-headed arrow 93 in FIG. 5A.

Figure 7:
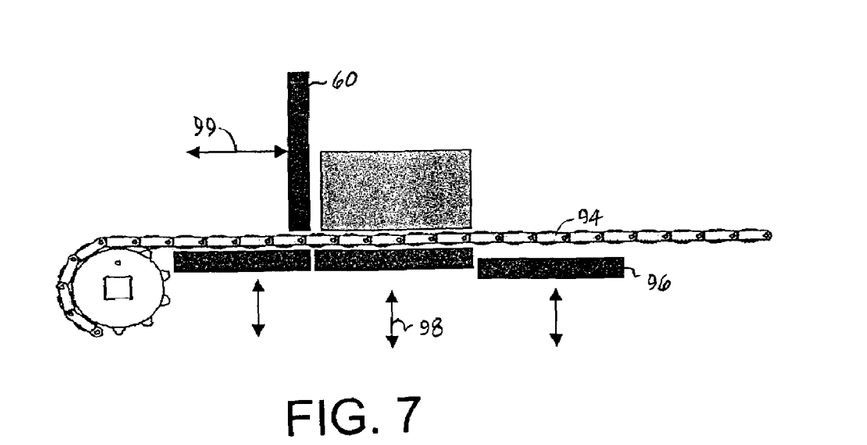
FIG. 7 is a side elevation view of another version of a portion of a conveyor as in FIG. 1 operating as a palletizer.

The palletizing conveyor shown in the example of FIGS. 4A-4F uses an upstream conveyor belt 82 and a separately driven downstream conveyor belt 12. But, as shown in FIG. 7, the two-belt system can be replaced by a single oblique-roller belt 94 with retractable roller bearing surfaces 96. The bearing surfaces may be vertically raised and lowered into and out of contact with the rollers as indicated by arrows 98. Individually actuated roller bearing surface selectively positioned along the carryway under the belt can program the belt to have different characteristics along its length. For example, with the bearing surfaces in a raised position engaging the rollers, conveyed articles are urged toward one side of the belt in that section. With the bearing surfaces in a lowered, non-engaging position and a stop 60 in place at the end of that section, blocked articles can be pushed toward the other side of the belt. To complement the programmability of the belt along its length, the stop may translate along the belt as indicated by arrow 99 to accumulate articles at various positions along the length of the carryway.

Although the invention has been described in detail with reference to preferred versions, other versions are possible. For example, the belt shown has rollers that extend from cavities through the belt's thickness past the outer and inner belt surfaces. But it would be possible to use a belt in which the rollers do not extend past the inner surface of the belt. With such a belt, different carryway bearing configurations could be used. Instead of linear wearstrips, chevron wearstrips or a continuous carryway pan would be possible. Another oblique-roller belt that could be used with almost any carryway configuration would be one in which the rollers are mounted completely above the outer belt surface. Alternatively, the rollers could pop up out of the belt cavities to engage conveyed articles along the carryway. In all these versions, the rollers could, instead of rotating about fixed axles, include integral stubs that define axes of rotation. The ends of the stubs could be rotatably received in belt recesses that would allow the rollers to rotate. As yet another example, the roller bearing surfaces underlying rollers could be static surfaces, such as on wearstrips or wearsheets, or rotatable surfaces, such as provided by rollers rotatable on axes in the direction of belt travel. So, as these few examples suggest, the scope of the claims is not meant to be limited to the versions described in detail.

What is claimed is:

1. A method for forming a pallet layer, comprising:
advancing consecutive articles along a first side of a conveyor moving in a conveying direction and having article-supporting rollers freely rotatable on axes oblique to the conveying direction;
blocking the advance of the articles with a stop while the conveyor continues moving to cause the rollers to rotate beneath the articles supported on the rollers to provide a component of force pushing the articles along the stop across the width of the conveyor toward an opposite second side of the conveyor;
forming a first pallet layer row by stopping a leading blocked article at the second side of the conveyor and trailing blocked articles against consecutive leading blocked articles in a row across the width of the conveyor.

2. The method of claim 1 further comprising:
forming subsequent pallet layer rows by using already formed pallet layer rows to block trailing articles and cause them to be pushed by the rollers across the moving conveyor along the upstream end of the blocked already formed pallet layer rows.

3. The method of claim 2 further comprising:
unblocking the conveyor to allow the formed pallet layer to be advanced downstream by the conveyor in the conveying direction.

4. The method of claim 3 further comprising:
forming a pallet by receiving consecutive pallet layers one atop another on a palletizer table at the downstream end of the conveyor.

5. The method of claim 2 further comprising:
feeding a first group of consecutive articles onto the conveyor in one orientation to form the first pallet layer row; and
feeding a second group of consecutive articles onto the conveyor in a different orientation to form a subsequent pallet layer row.

6. The method of claim 1 further comprising:
moving the stop to different positions along the conveyor to block the articles at the different positions.

7. A method for aligning articles against a guide along a conveyor, comprising:
advancing consecutive articles atop article-supporting rollers on a conveyor moving in a conveying direction, wherein the rollers are freely rotatable on axes oblique to the conveying direction;
blocking the advance of a first article of the consecutive articles with a stop while the conveyor continues moving to cause the rollers to rotate on the oblique axes beneath the first article to provide a component of force pushing the first article along the stop and against a guide at a side of the conveyor;
advancing a second article on the conveyor into contact with the blocked first article to cause the rollers beneath the first article to rotate and push the second article along the trailing end of the first article and against the guide.

8. The method of claim 7 further comprising:
moving the stop to different positions along the conveyor to block the articles at the different positions.

9. A method for moving accumulated articles laterally, comprising:
advancing articles atop article-supporting rollers on a conveyor moving in a conveying direction, wherein the rollers are freely rotatable on axes oblique to the conveying direction;
accumulating the articles at a stop blocking articles from advancing past the position of the stop as the conveyor continues to advance, wherein the rollers rotate by contact with the accumulated articles with a component of motion opposite the conveying direction;
moving the accumulated articles laterally toward a side of the conveyor by the rotation of the rollers beneath the accumulated articles with a component of motion directed to the side of the conveyor.

10. The method of claim 9 further comprising:
moving the stop to a different position along the conveyor to accumulate the articles at the different position.

* * * * *